United States Patent [19]

Landerholm

[11] Patent Number: 4,657,525
[45] Date of Patent: Apr. 14, 1987

[54] TRANSMISSION CHAIN

[75] Inventor: Lars G. Landerholm, Köping, Sweden

[73] Assignee: AB Volvo, Gothenburg, Sweden

[21] Appl. No.: 782,299

[22] Filed: Oct. 1, 1985

[30] Foreign Application Priority Data

Oct. 1, 1984 [SE] Sweden .................. 8404903

[51] Int. Cl.$^4$ .................................. F16G 1/24
[52] U.S. Cl. ............................ 474/242; 474/245
[58] Field of Search ........... 474/242, 237, 245, 232; 59/78, 84, 90

[56] References Cited

U.S. PATENT DOCUMENTS

| | | | |
|---|---|---|---|
| 1,313,171 | 8/1919 | Dukelow | 474/242 |
| 1,490,037 | 4/1924 | Shideed | 474/240 |
| 3,501,912 | 3/1970 | Gilson et al. | 59/78 |
| 4,473,365 | 9/1984 | Lapeyre | 474/242 X |

FOREIGN PATENT DOCUMENTS 415340 6/1925 Fed. Rep. of Germany .

Primary Examiner—James A. Leppink
Assistant Examiner—David J. Bagwell
Attorney, Agent, or Firm—Young & Thompson

[57] ABSTRACT

The invention relates to a transmission chain for transmission of torque between one pair of driving conical discs and another pair of driven conical discs in a continuously variable transmission. According to the invention, the chain is composed of identical, interlocking links in the form of blocks, the end surfaces of which are bevelled at an angle to fit the conical discs. Said blocks have opposite longitudinal sides having means with rolling contact surfaces for engagement with rolling contact surfaces on corresponding means of the adjacent links.

9 Claims, 4 Drawing Figures

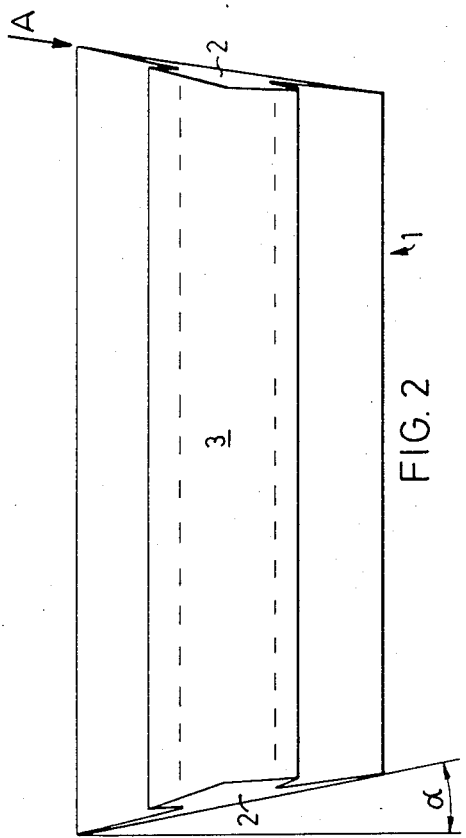
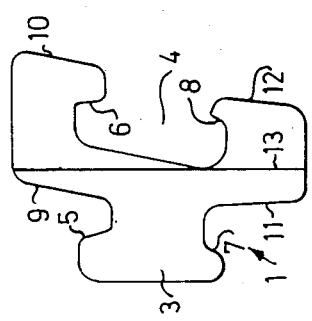
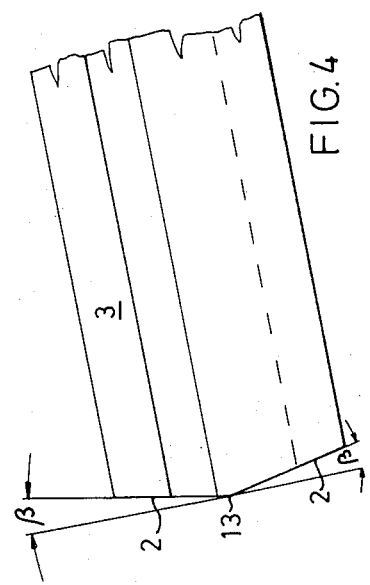

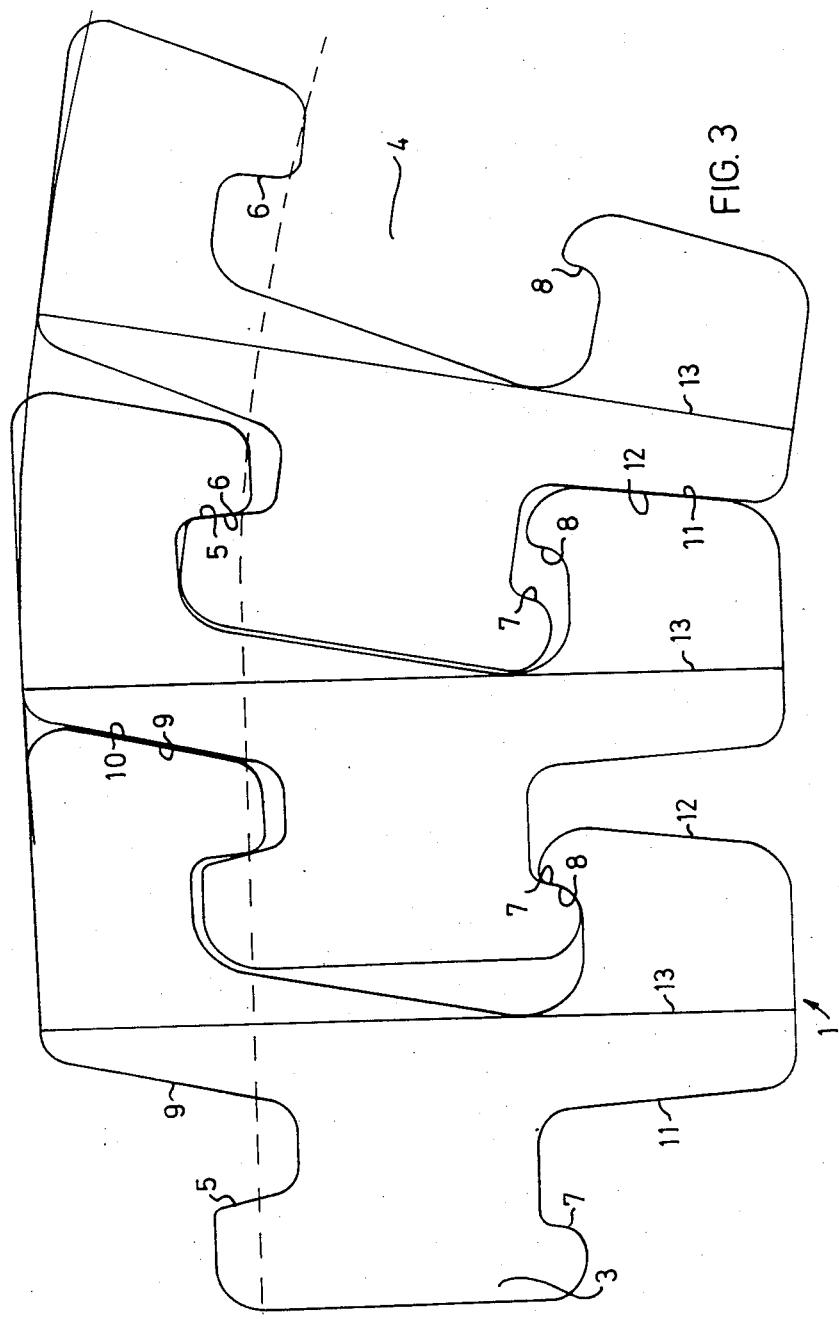

TRANSMISSION CHAIN

The present invention relates to a transmission chain for torque transmission from one pair of conical drive discs to another pair of driven conical discs in a continuously variable transmission, said chain comprising hingedly interconnected links.

A variety of different transmission chains for continuously variable conical disc pulley arrangements are previously known. They are composed of a large number of link plates provided with holes and hinged together by means of transverse pins, the ends of which are designed to absorb the compressive forces to which the chain is subjected when it is inbetween the conical discs.

A disadvantage of such chains is that they are composed of several different components, making the chain relatively complicated and expensive, due to, among other things, the extensive assembly work involved. Furthermore, chains of this type have a tendency to be quite noisy in operation, which is primarily attributable to the pin spacing or pitch of the chain. Noise decreases as the spacing between the pins is reduced, since the relative movement between adjacent links will then be less as the chain moves in frictional engagement around the conical discs and is jolted when the chain comes into contact and breaks contact with the discs.

One purpose of the present invention is to remove these disadvantages of the known chains and to achieve a transmission chain which is composed of a minimum number of components.

Another purpose is to achieve a transmission chain which produces little noise, by virtue of the fact that the chain pitch can be shortened.

A further purpose is to achieve a chain which is simple in design and is simple to assemble and thus cheaper to produce.

Still another purpose of the invention is to achieve a chain which can transmit high torque and which is highly efficient.

To achieve these purposes, the transmission chain described in the introduction is characterized in that the entire chain is composed of identical interlocking links in the form of blocks, the end surfaces of which are bevelled at an angle to fit the conical discs, said blocks having opposite longitudinal sides having means with rolling contact surfaces for engagement with rolling contact surfaces on corresponding means of the adjacent links. This enables the transmission chain to be assembled from a plurality of identical links of one single type, which only need be slotted into each other in sufficient numbers to produce an endless transmission chain according to the invention.

Preferably the engagement means on one longitudinal side of each link has a rolling contact surface similar to the flank profile of a cylindrical gear tooth, while the engagement means on the opposite longitudinal side of each link has a rolling contact surface similar to the flank profile of a rack tooth, so that the friction between the links is primarily rolling friction, resulting in high efficiency as the chain moves around the conical pairs of discs and the links move relative to each other.

According to a suitable embodiment of the invention, each link has, in cross-section, a substantially T-shaped projection on one longitudinal side and an essentially T-shaped cavity on its opposite longitudinal side, said cavity being shaped to pivotally hold the projection of an adjacent link. The chain can thereby be made with a short pitch, which alleviates the noise problem.

Suitably one rolling contact surface is disposed on one arm of the T-shaped projection, while the other rolling contact surface is disposed on a link portion which delimits the corresponding arm of the T-shaped cavity, while the other arm of the T-shaped projection has an abutment surface arranged so as to be in force-transmitting engagement, when the chain link is moving in a straight path, with a portion of the adjacent link, which portion delimits the corresponding arm portion of the T-shaped cavity 4.

The transmission chain according to the invention will be described in more detail below with reference to the accompanying drawing, in which FIG. 1 is an end view of a transmission chain link according to the invention, FIG. 2 is a side view of the link in FIG. 1, FIG. 3 shows three interlocking links in a chain, and FIG. 4 shows a link viewed in the direction of the arrow A in FIG. 2.

The transmission chain according to the invention is composed of a plurality of pivotally interlocking links, one of which is shown in end elevation in FIG. 1. Each link 1 has the shape of an elongated block with end surfaces 2 (FIGS. 2 and 4), which in the plan view in FIG. 4 are slightly convex or double-bevelled at an angle $\beta$ to form a contact line 13. The angle of inclination $\alpha$ in the side view in FIG. 2 corresponds to the cone angle of the pairs of conical drive discs (not shown) between which the chain runs endlessly in a known manner during use.

One longitudinal side of the link 1 has an essentially T-shaped projection 3, while the opposite longitudinal side has an essentially T-shaped cavity 4. The upper arm of the T-shaped projection has a flank surface 5 with a profile substantially like the flank profile of a cylindrical gear tooth, preferably an involute profile, while that portion 6 of the link 1 which delimits the corresponding arm portion of the T-shaped cavity 4, has a profile substantially like the flank profile of a rack tooth. The cavity 4 is shaped to pivotally hold the projection 3 of an adjacent link 1 in such a manner that the rolling contact surfaces 5 and 6 are in continual contact with each other. When the links 1 are moving in a straight path between the two conical disc pairs, an abutment surface 7 on the other arm of the projection 3 is disposed to lie in force-transmitting contact against an abutment surface 8 on the portion of the adjacent link 1 which delimits the corresponding arm portion of the cavity 4, as is shown between the two links 1 to the left in FIG. 3. Thus tensile forces in the transmission chain are transmitted along two parallel lines between adjacent links 1. The upper lateral surfaces 9 and 10 of the links 1 can be abutment surfaces which serve to limit the outward pivoting of the links 1, while the lower lateral surfaces 11 and 12 can serve to limit the inward pivoting of the links 1. The contact points on the rolling contact surfaces 5 and 6 of each link 1 are located at the same distance from the contact line 13 to provide symmetrical pivoting and to prevent radial movements of the links during disc entry and exit when the disc spacing is held constant.

When the chain comes between the discs in each of the two disc pairs, each link 1 is held securely to the disc along the contact line 13 on the end surfaces 2 of each link 1, whereupon an inward pivoting is initiated between adjacent links 1, with a rolling contact movement between the flank surfaces 5 and 6, as is shown between the two right-hand links in FIG. 3. The extent of this inward pivoting, i.e. to a maximum curvature, is limited by the lower lateral surfaces 11 and 12 of the links 1, as is illustrated by the two right-hand links 1 in FIG. 3.

In the embodiment shown of the transmission chain according to the invention, the projection arm 3 with the flank surface 5 can be either a driving or a driven tooth, and by analogy the flank surface 6 forms a limiting surface of a driven or a driving tooth, which means that the chain can be driven in either direction with equally good results.

As is evident from the above, the transmission chain according to the invention is entirely composed of a single component in sufficient numbers to form the desired endless chain. This extremely simple design provides a chain which can be mass-produced and assembled by machine at a relatively low cost at the same time as the chain has a small pitch and optimal force-transmitting rolling contact surfaces with small power losses as the chain enters into or exits from the conical pairs of discs.

We claim:

1. Transmission chain for torque transmission from one pair of conical drive discs to another pair of driven conical discs in a continuously variable transmission ratio, said chain comprising hingedly interconnected links and being composed of identical, interlocking links in the form of blocks having opposite end surfaces bevelled at an angle to fit the conical discs, said blocks having opposite longitudinal sides having means with rolling contact surfaces for engagement with rolling contact surfaces on corresponding means of the adjacent links, said end surfaces being also bevelled both forwardly and rearwardly in the direction of movement of the chain to form a contact line on the block for linear contact with the respective discs, said contact line extending transversely of said direction of movement.

2. Transmission chain according to claim 1, wherein said contact line is spaced between points of mutual contact of the respective rolling contact surfaces of adjacent links.

3. Transmission chain according to claim 1, wherein the engagement means on one longitudinal side of each link has a rolling contact surface, substantially like the flank profile of a gear-wheel tooth, while the engagement means on the opposite longitudinal side of the link has a rolling contact surface, substantially like the flank profile of a rack tooth.

4. Transmission chain according to claim 1, wherein the link has, in cross-section, a substantially T-shaped projection on one longitudinal side and an essentially T-shaped cavity on its opposite longitudinal side, said cavity being shaped to pivotally hold the projection of an adjacent link.

5. Transmission chain according to claim 4, wherein one rolling contact surface is disposed on one arm of the T-shaped projection, while the other rolling contact surface is disposed on a link portion which delimits the corresponding arm portion of the T-shaped cavity.

6. Transmission chain according to claim 5, wherein the other arm of the T-shaped projection has an abutment surface arranged so as to be in force-transmitting engagement, when the chain link is moving in a straight path, with a portion of the adjacent link, which portion delimits the corresponding arm portion of the T-shaped cavity.

7. Transmission chain according to claim 5, wherein the rolling contact surfaces are disposed on the radially outward arm of the T-shaped projection and on the radially outward arm of the T-shaped cavity when the chain is viewed in longitudinal section.

8. Transmission chain according to claim 7, wherein the rolling contact surface with the flank profile of a gear-wheel tooth constitutes a driving tooth surface on the T-shaped projection, while the rolling contact surface with the flank profile of a rack tooth is a driven tooth surface.

9. Transmission chain according to claim 1, wherein the longitudinal sides of the links are disposed to limit the pivotability between the links by abutment against corresponding longitudinal sides of adjacent links.

* * * * *